US006806946B2

(12) United States Patent
Otaki

(10) Patent No.: US 6,806,946 B2
(45) Date of Patent: Oct. 19, 2004

(54) FEED PAPER APPARATUS

(75) Inventor: Mitsuhiko Otaki, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 20 days.

(21) Appl. No.: 10/320,392

(22) Filed: Dec. 17, 2002

(65) Prior Publication Data

US 2004/0114126 A1 Jun. 17, 2004

(51) Int. Cl.[7] ........................ G03B 27/00; G03G 15/00; B65H 83/00

(52) U.S. Cl. ...................... 355/407; 399/361; 271/3.14; 271/3.15

(58) Field of Search ......................... 355/407; 399/361; 271/3.14, 3.15, 259

(56) References Cited

U.S. PATENT DOCUMENTS 5,365,311 A * 11/1994 Matsuoka .................... 399/13
5,441,247 A * 8/1995 Quilliam .................. 271/10.04
5,451,039 A * 9/1995 Adachi ...................... 271/9.06
5,839,015 A * 11/1998 Faguy et al. .................. 399/23
5,882,005 A * 3/1999 Araseki et al. ............. 271/126
6,290,225 B1 * 9/2001 Linder et al. ............... 271/155
6,460,846 B2 * 10/2002 Yow et al. .................. 271/155

FOREIGN PATENT DOCUMENTS

JP 5-338823 A 12/1993

* cited by examiner

*Primary Examiner*—Rodney Fuller
(74) *Attorney, Agent, or Firm*—Foley & Lardner LLP

(57) ABSTRACT

A paper feed has a door and a paper carrying tray, and raises the tray as paper is fed. A first detector that detects the presence of paper is located below a paper feed position by a margin corresponding to a given number of paper sheets, and second detector that detects the presence of paper is located below the first detector. If an open state of the door is detected, the paper carrying tray is lowered to a position where the second detector ceases to detect the presence of paper. If the first and second detectors detect the presence of paper after the tray is lowered, the tray is lowered to the position where the second detector ceases to detect the presence of paper. If a closed state of the door is detected after the tray is lowered, the tray is raised so that the uppermost one of paper sheets on the tray is situated in the paper feed position.

14 Claims, 6 Drawing Sheets

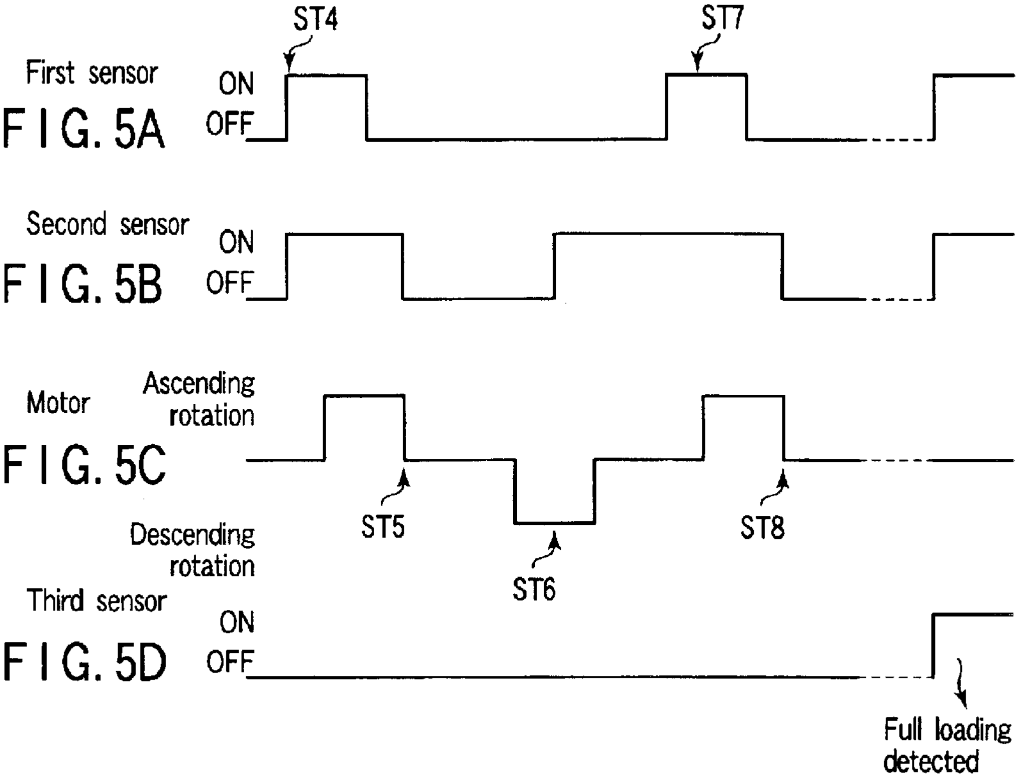
FIG. 5A
FIG. 5B
FIG. 5C
FIG. 5D
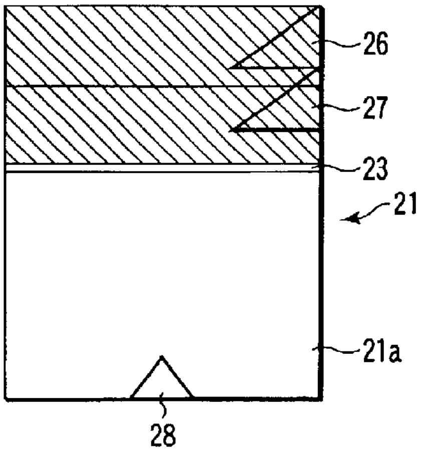
FIG. 6
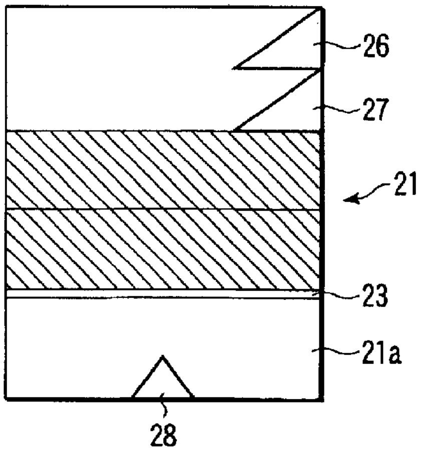
FIG. 7

FEED PAPER APPARATUS

BACKGROUND OF THE INVENTION

The present invention relates to a paper feed apparatus used in a copying machine for feeding paper.

A large-capacity feeder (hereinafter referred to as LCF) is an apparatus that can singly store 3,000 to 4,000 paper sheets. The frequency of paper supply can be reduced by storing the LCF with paper sheets of a size that is used frequently.

In this LCF, a paper carrying tray is moved up and down by means of an elevator mechanism, and a paper feed section feeds the uppermost one of paper sheets on the tray.

If a door of the LCF is opened for paper supply, however, the paper carrying tray moves to its lowest position so that paper can be inserted.

If the number of paper sheets to be supplied is small, however, the paper carrying tray moves to the lowest position when the door is opened for paper supply. After the paper supply, therefore, it takes time for each paper sheet to be situated in a paper feed position.

If the paper carrying tray has a storage capacity of 4,000 sheets, for example, paper supply cannot be started unless the tray is raised by a margin corresponding to 3,500 sheets when it is supplied with only 500 sheets, which is very wasteful.

Thus, it takes a lot of time to start copying if a small quantity of paper is supplied to the large-capacity paper feed apparatus in a copying machine.

BRIEF SUMMARY OF THE INVENTION

The object of the present invention is to shorten the release time after paper supply if a small quantity of paper is supplied to a large-capacity paper feed apparatus.

In order to achieve the above object, there is provided a paper feed apparatus which has a door adapted to be opened and closed as paper is supplied, successively feeds paper on the top portion of a paper carrying tray, and raises the tray as the paper is fed, the paper feed apparatus comprising: a door detector which detects the state, open or closed, of the door; a first detector which is located below a paper feed position by a margin corresponding to a given number of paper sheets and detects the presence of paper; a second detector which is located below the first detector and detects the presence of paper; first lowering means which lowers the paper carrying tray to a position where the second detector ceases to detect the presence of paper if the door detector detects the open state of the door; second lowering means which lowers the paper carrying tray to the position where the second detector ceases to detect the presence of paper if the first and second detectors detect the presence of paper; and raising means which raises the paper carrying tray so that the uppermost one of paper sheets on the tray is situated in the paper feed position if the door detector detects the closed state of the door after the tray is lowered by means of the first or second lowering means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A to 5D are timing charts for illustrating the process of supplying paper to the paper feed apparatus;

FIGS. 6, 7, 8, 9, 10, 11, 12, 13, 14, 15 and 16 are views showing the way paper is stored in the paper feed apparatus.

DETAILED DESCRIPTION OF THE INVENTION

An image forming apparatus according to an embodiment of the present invention will now be described with reference to the accompanying drawings.

Figure 1:
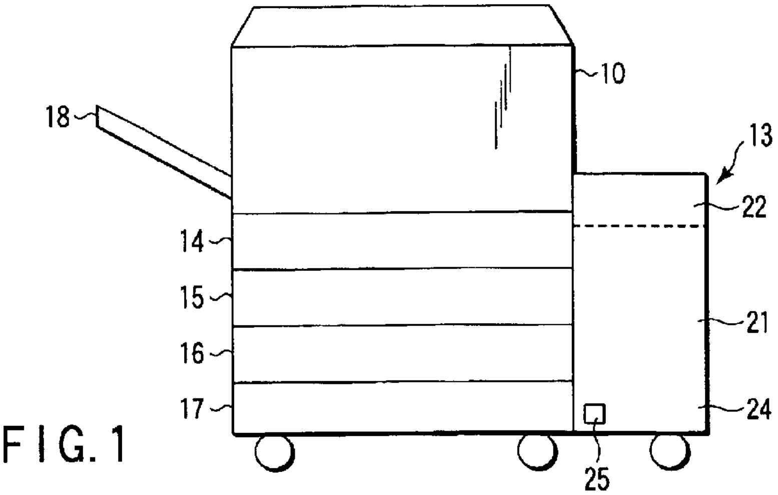
FIG. 1 is a view showing an outline of an image forming apparatus.

FIG. 1 is a view showing an outline of a copying machine as an example of the image forming apparatus of the invention.

As shown in FIG. 1, the copying machine 1 comprises a machine body 10, which contains a scanner section 11 for use as reading means and a printer section 12 that serves as image forming means.

An automatic document feeder (hereinafter referred to as ADF) is swingably mounted on the upper part of the machine body 10. It doubles as a document cover and automatically feeds sheetlike documents one after another. A platen may be mounted as a document cover in place of the ADF. A control panel (not shown) is disposed on the front part of the upper surface of the body 10. It is provided with various control keys, displays, etc. for indicating copying conditions and start of copying.

A large-capacity paper feed apparatus 13 capable of storing a large quantity of paper is removably attached to the right-hand side portion of the machine body 10.

Paper cassettes 14, 15, 16 and 17 are removably attached to the lower part of the machine body 10. Each of these paper cassettes is stored with paper sheets of the same size that are arranged horizontally and vertically. The cassettes can be alternatively selected as required. A receiving tray 18 that receives copied sheets is attached to the left-hand side portion of the machine body 10.

The large-capacity paper feed apparatus (cassette unit) 13 is composed of a storage section 21 and a paper feed section 22, which is formed of a motor for paper transportation and a clutch, rollers, etc. for paper feed. The paper feed section 22 is provided with an actuator and a sensor for detecting the presence of paper and the upper limit of the paper carrying tray 23.

Figure 2:
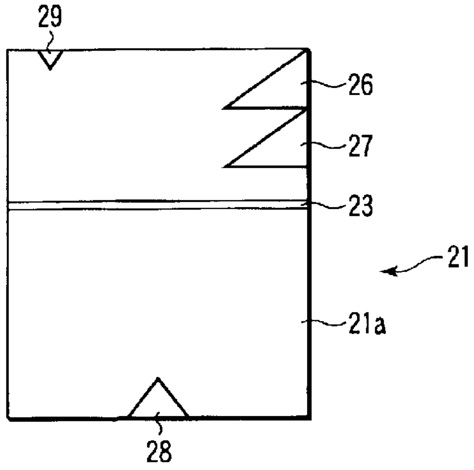
FIG. 2 is a view showing an outline of a paper feed apparatus.

As shown in FIG. 2, a case 21*a* of the storage section 21 contains the paper carrying tray 23, which carries thereon a sheet to be fed. The tray 23 can be raised or lowered by means of an elevator (not shown). The elevator mechanism is designed so that the tray 23 is lowered or raised as forward or reverse rotation of a motor 31 (mentioned later) is transmitted to the mechanism.

The paper feed apparatus 13 is provided with a door 24 that is opened at the time of paper supply. The door 24 is provided with a door detector 25 that is turned on or off as the door is closed or opened.

The paper feed apparatus 13 is provided with a first sensor (first detector) 26, second sensor (second detector) 27, third sensor (third detector) 28, and a paper feed position sensor (paper detector) 29. The first and second sensors 26 and 27 are turned on or off by any paper sheet on the paper carrying tray 23, thereby detecting the presence of paper. The third sensor 28 detects the lower limit position of the paper carrying tray 23. The paper feed position sensor 29 detects whether or not the upper end of the sheet on the tray 23 is situated in a paper feed position for the paper feed section 22.

Each of the sensors described above may be a mechanical one that is formed of an actuator and a microswitch or an optical one that is formed of a light emitting element and a light receiving element.

For example, the first sensor 26 is located in a position lower than the upper limit position of the paper carrying tray 23 by a distance corresponding to 500 sheets (equivalent to a pack of paper sheets). The second sensor 27 is located in a position lower than the upper limit position of the tray 23 by a distance corresponding to 1,000 sheets. The location of the second sensor 27 must only be below the first sensor 26.

Figure 3:
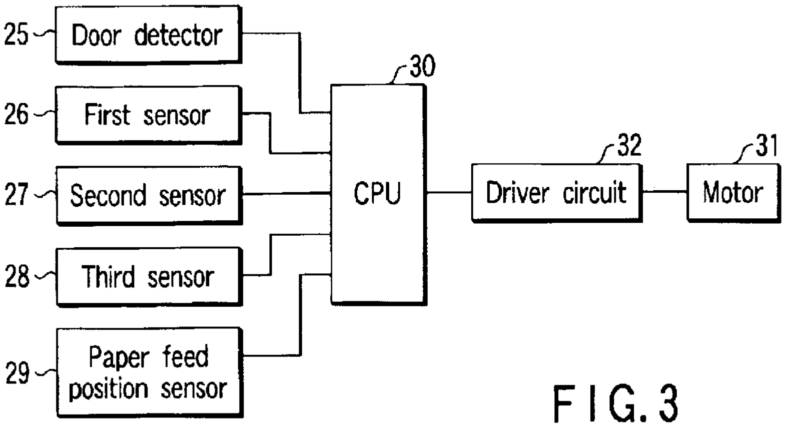
FIG. 3 is a block diagram showing the internal configuration of a control circuit of the paper feed apparatus.

The internal configuration of a control circuit of the paper feed apparatus 13 will now be described with reference to FIG. 3.

The paper feed apparatus 13 is provided with a CPU 30 for controlling the apparatus. The CPU 30 is connected with a driver circuit (drive section) 32 that rotates the motor 31 in the forward or reveres direction. As the rotation of the motor 31 is transmitted to the elevator mechanism (not shown), the paper carrying tray 23 is lowered or raised.

Further, the CPU 30 is connected with the door detector 25, first, second, and third sensors 26, 27 and 28, and paper feed position sensor 29.

The CPU 30 concludes that paper is evacuated if the paper feed position sensor 29 detects the absence of paper when the paper carrying tray 23 is situated in the upper limit position.

Further, the CPU 30 concludes that the number of paper sheets on the tray is nearly zero if the first and second sensors 26 and 27 detect the presence and absence, respectively, of paper.

Figure 4:
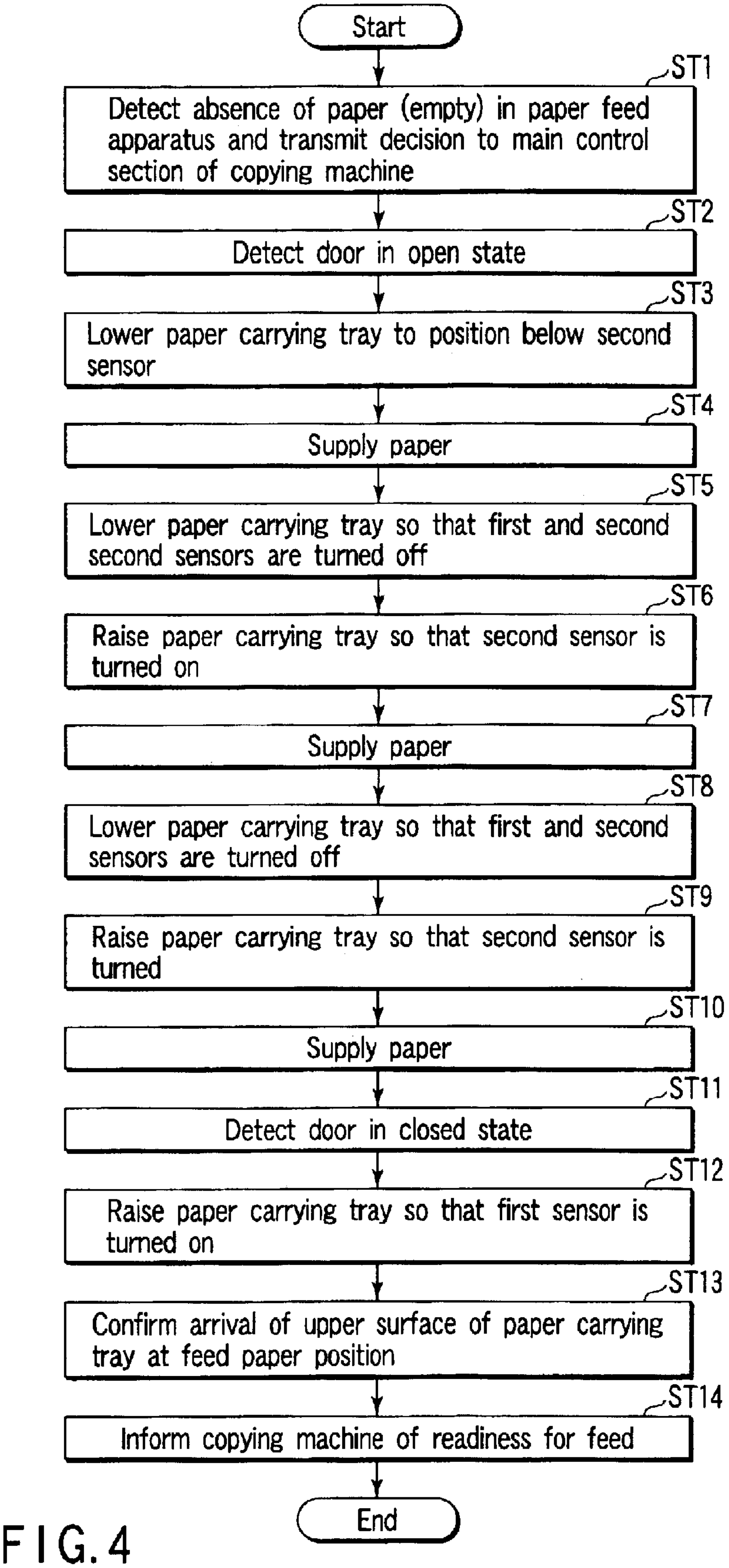
FIG. 4 is a flowchart for illustrating a process of supplying paper to the paper feed apparatus.

A process of supplying paper to the paper feed apparatus 13 arranged in this manner will now be described with reference to the flowcharts of FIGS. 4 and 17, timing charts of FIGS. 5A to 5D, and the states of storage of paper shown in FIGS. 6 to 16.

The paper supply process with no paper stored will be described first.

If the paper feed position sensor 29 detects the absence of paper when the paper carrying tray 23 is situated in the upper limit position, the CPU 30 concludes that there is no paper (empty) in the paper feed apparatus 13, and transmits the decision to a main control section of the copying machine 1 (ST1). Thereupon, the main control section of the copying machine 1 drives the control panel to indicate the absence of paper (empty) in the paper feed apparatus 13 for guidance.

Based on this guidance, an operator opens the door 24 of the paper feed apparatus 13 and starts paper supply.

If the CPU 30 concludes from a detection signal from the door detector 25 that the door 24 is open (ST2), it rotates the motor 31 forward, thereby lowering the paper carrying tray 23 to a position below the first sensor 26 (ST3). Thus, the state of FIG. 2 is established.

If paper is supplied (stacked) in this state to turn on the first and second sensors 26 and 27 (or if the presence of paper is detected) (ST4), as shown in FIG. 6, the CPU 30 concludes that paper is supplied. After the passage of a given time, the motor 31 is rotated forward to lower the paper carrying tray 23 so that the sensors 26 and 27 are turned off (to indicate the absence of paper) with the third sensor 28 kept off, as shown in FIG. 7 (ST5).

If a fixed settable time (state of FIG. 7) continues, thereafter, the motor 31 is rotated reversely to raise the paper carrying tray 23 so that the second sensor 27 detects the presence of paper.

Figure 8:
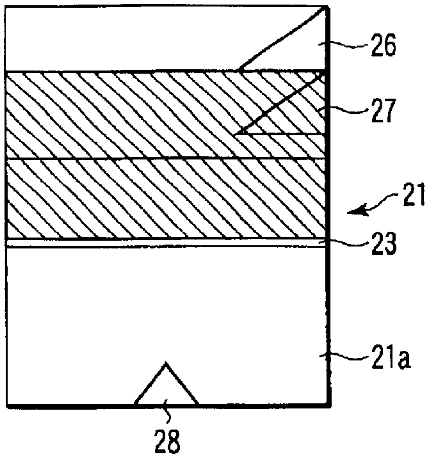

Thus, after the passage of a given time, the CPU 30 rotates the motor 31 reversely to raise the paper carrying tray 23 so that the second sensor 27 is turned on (or the presence of paper is detected), as shown in FIG. 8 (ST6).

Figure 9:
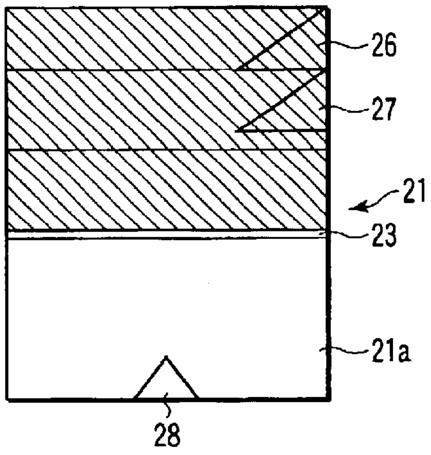
Figure 10:
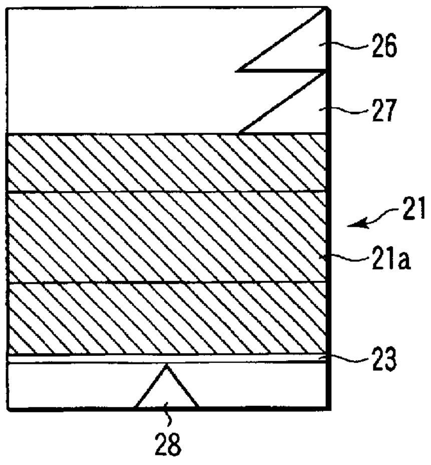

If paper is supplied in this state so that the first sensor 26 is turned on (or the presence of paper is detected) (ST7), as shown in FIG. 9, the CPU 30 concludes that paper is supplied. After the passage of a given time, the motor 31 is rotated forward to lower the paper carrying tray 23 so that the first and second sensors 26 and 27 are turned off with the third sensor 28 kept off, as shown in FIG. 10 (ST8).

Figure 11:
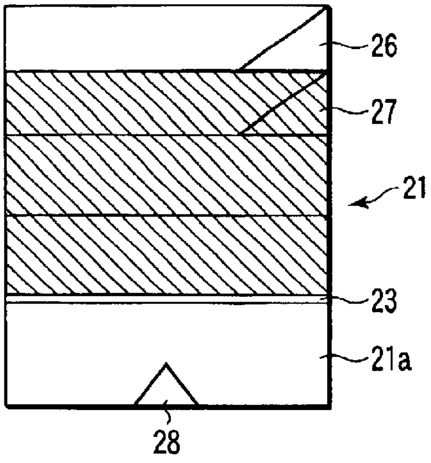

After the passage of a given time, thereafter, the CPU 30 rotates the motor 31 reversely to raise the paper carrying tray 23 so that the second sensor 27 is turned on, as shown in FIG. 11 (ST9).

As Steps ST7 to ST9 are repeated, thereafter, the paper carrying tray 23 is fully loaded with paper.

Figure 12:
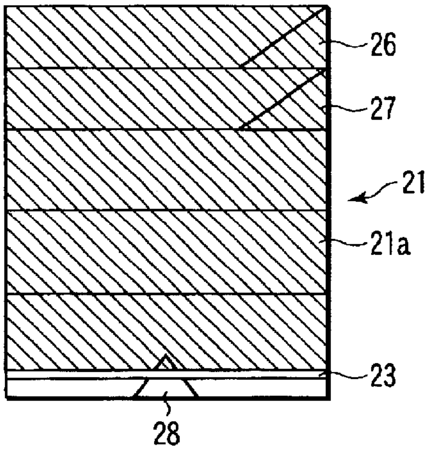

When the first, second, and third sensors 26, 27 and 28 are all on, as shown in FIG. 12, the CPU 30 concludes that the paper carrying tray 23 is full (ST10) and prevents the tray 23 from lowering.

Thus, it is concluded that the paper carrying tray 23 is fully loaded with paper as the third sensor 28 detects the lower limit position of the tray 23 and as the first and second sensors 26 and 27 detect the presence of paper.

If the paper supply is interrupted in the state of Step ST5 or ST8, moreover, the paper carrying tray 23 ascends in the manner shown in FIG. 8 or 11 after the passage of a given time. Therefore, the upper surface of the carried paper is located close to the paper feed position, so that the tray 23 can ascend to the paper feed position in a short time after the door 24 is closed. Thus, the waiting time for the start of copying after the paper supply can be shortened.

If the CPU 30 concludes from a detection signal from the door detector 25 that the door 24 is closed (ST11) in the state of Step ST5, ST8 or ST10, it rotates the motor 31 reversely to raise the paper carrying tray 23 so that the first sensor 26 is turned on (or the presence of paper is detected) (ST12). Thereupon, the CPU 30 concludes from a detection signal from the paper feed position sensor 29 that the paper feed position is reached by the upper surface of the paper on the tray 23 (ST13). In consequence, the CPU 30 informs the main control section of the copying machine 1 that paper is ready to be fed (ST14).

Figure 13:
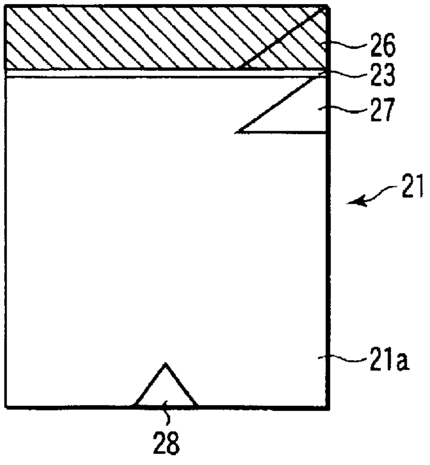

Further, the CPU 30 concludes that the number of paper sheets on the tray is nearly zero if the first and second sensors 26 and 27 detect the presence and absence, respectively, of paper, as shown in FIG. 13.

The following is a description of the paper supply process with paper stored.

In order to supply paper to the paper feed apparatus 13, the operator first opens the door 24 of the apparatus 13 and starts paper supply.

If the CPU 30 concludes from a detection signal from the door detector 25 that the door 24 is open (ST20), the paper feed position sensor 29 detects paper on the paper carrying tray 23 (ST21) and determines whether or not the paper is jammed (ST22).

If it is concluded in Step ST22 that the paper is not jammed, the CPU 30 rotates the motor 31 forward to lower the paper carrying tray 23 so that the first and second sensors 26 and 27 are turned off (or the absence of paper is detected) with the third sensor 28 kept off (ST23). Thus, the state of FIG. 7 replaces the state of FIG. 6.

Figure 14:
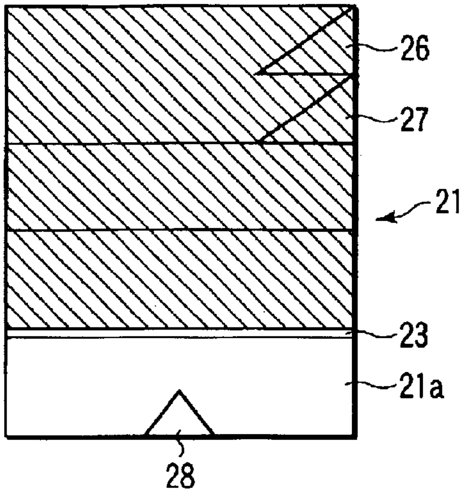

If paper is supplied (loaded) in this state so that the first and second sensors 26 and 27 are turned on (or the presence of paper is detected) (ST24), as shown in FIG. 14, the CPU 30 concludes that paper is supplied. After the passage of a given time, the motor 31 is rotated forward to lower the paper carrying tray 23 so that the first and second sensors 26 and 27 are turned off (or the absence of paper is detected) with the third sensor 28 kept off (ST25).

Figure 15:
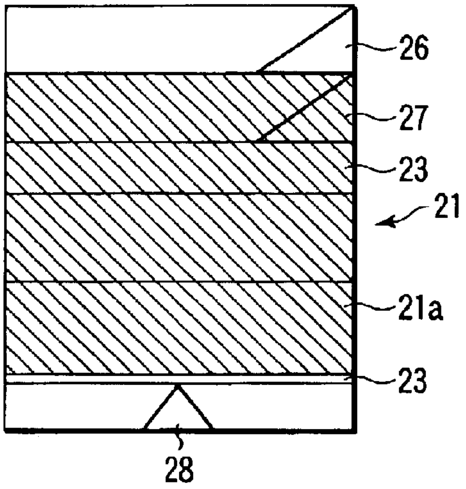

If the third sensor 28 is turned on with the first and second sensors 26 and 27 off and on, respectively, as shown in FIG. 15, the CPU 30 concludes that the paper carrying tray 23 is lowered to its lower limit position, and stops the rotation of the motor 31 (ST26).

Figure 16:
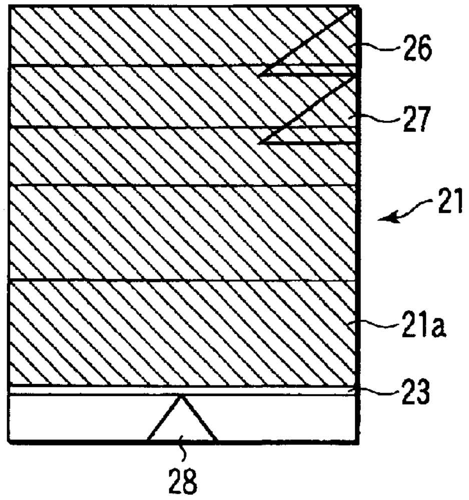
Figure 17:
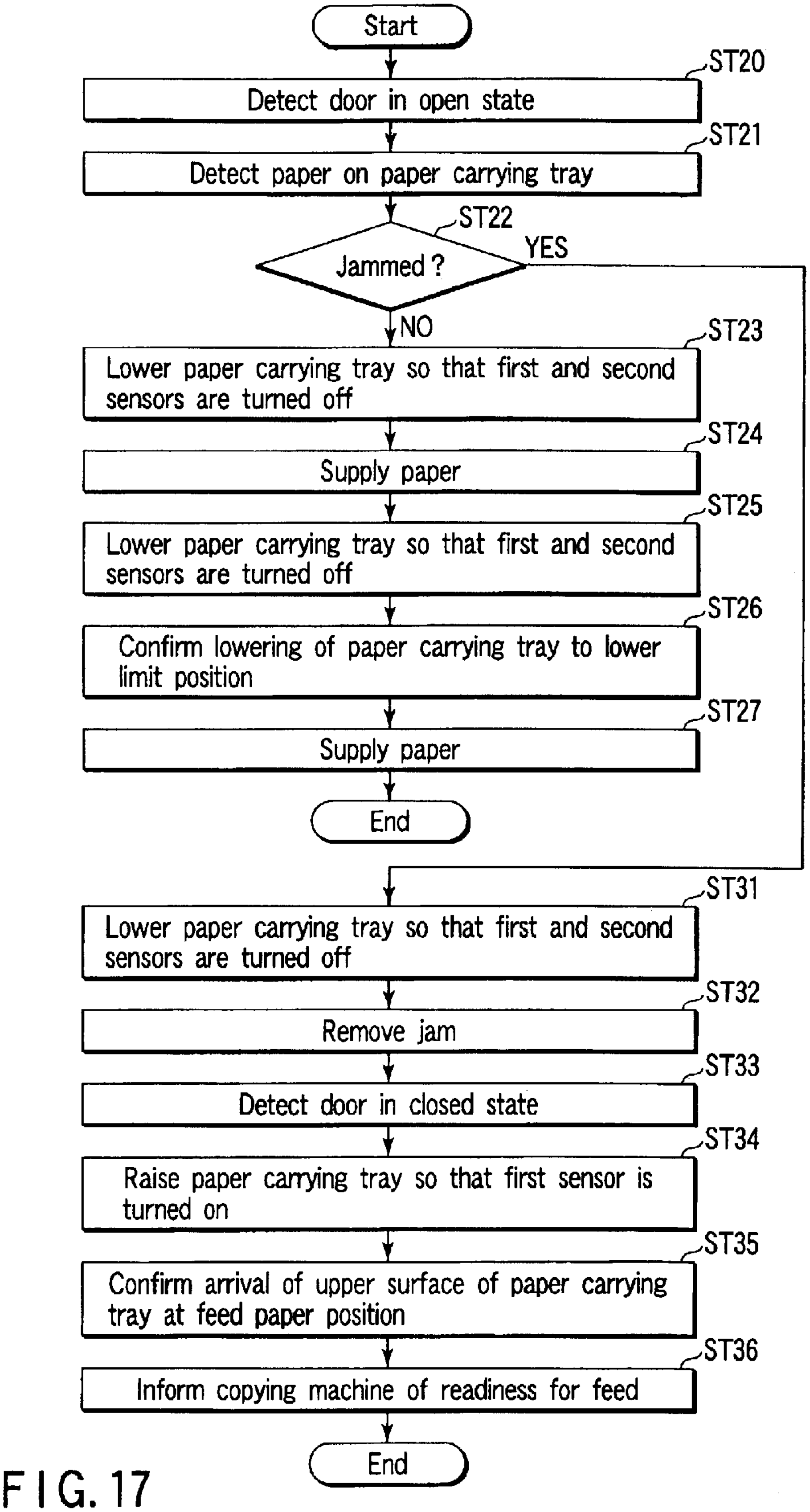
FIG. 17 is a flowchart for illustrating the process of supplying paper to the paper feed apparatus.

If paper is supplied in this state so that the first sensor 26 is turned on (or the presence of paper is detected) (ST27), as shown in FIG. 16, the CPU 30 concludes that the paper carrying tray 23 is full (ST28) and restrains the tray 23 from lowering when the first, second, and third sensors 26, 27 and 28 are all on.

Thus, it is concluded that the paper carrying tray 23 is fully loaded with paper as the third sensor 28 detects the lower limit position of the tray 23 and as the first and second sensors 26 and 27 detect the presence of paper.

If it is concluded in Step ST22 that the paper is jammed, the CPU 30 rotates the motor 31 forward to lower the paper carrying tray 23 so that the first and second sensors 26 and 27 are turned off (or the absence of paper is detected) with the third sensor 28 kept off (ST31). Thus, the state of FIG. 7 replaces the state of FIG. 6.

If the paper jam is removed (ST32) in this state and if it is concluded from a detection signal from the door detector 25 that the door 24 is closed (ST33), the motor 31 is rotated reversely to raise the paper carrying tray 23 so that the first sensor 26 is turned on (or the presence of paper is detected) (ST34). Thereupon, the CPU 30 concludes from a detection signal from the paper feed position sensor 29 that the paper feed position is reached by the upper surface of the tray 23 (ST35). In consequence, the CPU 30 informs the main control section of the copying machine 1 that paper is ready to be fed (ST36).

As described above, the paper feed apparatus has the door adapted to be opened and closed as paper is supplied, successively feeds paper on the top portion of the paper carrying tray, and raises the tray as the paper is fed. In this paper feed apparatus, the first detector that detects the presence of paper is located below the paper feed position by a margin corresponding to a given number of paper sheets, and the second detector that detects the presence of paper is located below the first detector. If an open state of the door is detected, the paper carrying tray is lowered to a position where the second detector ceases to detect the presence of paper. If the first and second detectors detect the presence of paper after the tray is lowered in this manner, the tray is lowered to the position where the second detector ceases to detect the presence of paper. If a closed state of the door is detected after the tray is lowered in this manner, the tray is raised so that the uppermost one of paper sheets on the tray is situated in the paper feed position.

Thus, the release time after paper supply can be shortened if a small quantity of paper is supplied to the large-capacity paper feed apparatus.

Further, the quantity of paper supply is detected, and the paper carrying tray is lowered in stages. The tray is raised if it continues to stay on the same height level for a given time. Thus, the position of the paper on the paper carrying tray of the paper feed apparatus can be brought closer to the paper feed position of the copying machine body, so that copying can be started in a shorter time.

If the paper supply is interrupted, moreover, the paper carrying tray ascends after the passage of a given time. Therefore, the upper surface of the carried paper is located close to the paper feed position of the copying machine body, so that the tray can ascend in a short time-after the paper feed apparatus is set in the machine body. Thus, the waiting time for the start of copying after the paper supply can be shortened.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.,

What is claimed is:

1. A paper feed apparatus which has a door adapted to be opened and closed as paper is supplied, successively feeds paper on the top portion of a paper carrying tray, and raises the tray as the paper is fed, the paper feed apparatus comprising:

a door detector which detects the state, open or closed, of the door;

a first detector which is located below a paper feed position by a margin corresponding to a given number of paper sheets and detects the presence of paper;

a second detector which is located below the first detector and detects the presence of paper; and an elevator mechanism a) which lowers the paper carrying tray to a position where the second detector ceases to detect the presence of paper if the door detector detects the open state of the door, b) which lowers the paper carrying tray to the position where the second detector ceases to detect the presence of paper if the first and second detectors detect the presence of paper, c) which raises the paper carrying tray so that the uppermost one of paper sheets on the tray is situated in the paper feed position if the door detector detects the closed state of the door after the tray is lowered to either a) the position where the second detector ceases to detect the presence of paper if the door detector detects the open state of the door, or b) the position where the second detector ceases to detect the presence of paper if the first and second detectors detect the presence of paper.

2. A paper feed apparatus according to claim 1, wherein the elevator mechanism raises the paper carrying tray to a position where the second detector detects the presence of paper if the presence of paper is not detected by the first or second detector in a given time after the tray is lowered to either a) the position where the second detector ceases to detect the presence of paper if the door detector detects the open state of the door, or b) the position where the second detector ceases to detect the presence of paper if the first and second detectors detect the presence of paper.

3. A paper feed apparatus according to claim 1, which further comprises a third detector which detects the location of the paper carrying tray in a lower limit position, and wherein it is determined that the tray is fully loaded with paper if the presence of paper is detected by the first and second detectors and if the location of the tray in the lower limit position is detected by the third detector.

4. A paper feed apparatus according to claim 1, wherein it is determined that the number of paper sheets on the paper carrying tray is nearly zero if the first and second detectors detect the presence and absence, respectively, of paper.

5. A paper feed apparatus according to claim 1, which further comprises a paper detector which detects the presence or absence of paper on the paper carrying tray, and wherein the paper carrying tray is lowered close to a set position for the second detector if the door detector and the paper detector detect the open state of the door and the absence of paper, respectively.

6. A paper feed apparatus which feeds paper, comprising:

a storage section which stores paper;

a paper carrying tray which carries paper thereon and moves the storage section up and down;

a paper feed section which feeds a paper sheet on the top portion of the paper carrying tray;

a drive section which raises or lowers the paper carrying tray;

a door detector which detects the state, open or closed, of a door which opens and closes the storage section;

a paper detector which is located on the top portion of the storage section and detects the presence of paper on the paper carrying tray;

a first detector which is located below the top portion of the storage section by a margin corresponding to a given number of paper sheets and detects the presence of paper;

a second detector which is located below the position of detection by the first detector and detects the presence of paper; and an elevator mechanism a) which drives the drive section to lower the paper carrying tray to a position where the second detector ceases to detect the presence of paper if the paper detector and the door detector detect loading of paper and the open state of the door, respectively b) which drives the drive section to lower the paper carrying tray to the position where the second detector ceases to detect the presence of paper if the first and second detectors detect the storage of paper after the lowering, c) which drives the drive section to raise the paper carrying tray so that the uppermost one of paper sheets on the tray is situated in a paper feed position for the paper feed section if the door detector detects the closed state of the door after the tray is lowered to either a) the position where the second detector ceases to detect the presence of paper if the paper detector and the door detector detect loading of paper and the open state of the door, respectively, or b) the position where the second detector ceases to detect the presence of paper if the first and second detectors detect the storage of paper after the lowering.

7. A paper feed apparatus according to claim 6, wherein the elevator mechanism raises the paper carrying tray to a position where the second detector detects the presence of paper if the presence of paper is not detected by the first or second detector in a given time after the tray is lowered to either a) the position where the second detector ceases to detect the presence of paper if the paper detector and the door detector detect loading of paper and the open state of the door, respectively, or b) the position where the second detector ceases to detect the presence of paper if the first and second detectors detect the storage of paper after the lowering.

8. A paper feed apparatus according to claim 6, which further comprises a third detector which detects the location of the paper carrying tray in a lower limit position, and wherein it is determined that the tray is fully loaded with paper if the presence of paper is detected by the first and second detectors and if the location of the tray in the lower limit position is detected by the third detector.

9. A paper feed apparatus according to claim 6, wherein it is determined that the number of paper sheets on the paper carrying tray is nearly zero if the first and second detectors detect the presence and absence, respectively, of paper.

10. A paper feed apparatus according to claim 6, wherein the paper carrying tray is lowered close to a set position for the second detector if the door detector and the paper detector detect the open state of the door and the absence of paper, respectively.

11. A paper feed apparatus according to claim 1, wherein the paper carrying tray has a predetermined height that allows for a predetermined number of sheets of paper to be filled therein, and wherein the second detector is positioned such that it detects a presence of absence of paper at a predetermined position that is between a bottom surface and a top surface of the paper carrying tray.

12. A paper feed apparatus according to claim 11, wherein the predetermined position is closer to the top surface than to the bottom surface of the paper carrying tray.

13. A paper feed apparatus according to claim 6, wherein the paper carrying tray has a predetermined height that allows for a predetermined number of sheets of paper to be filled therein, and wherein the second detector is positioned such that it detects a presence of absence of paper at a predetermined position that is between a bottom surface and a top surface of the paper carrying tray.

14. A paper feed apparatus according to claim 13, wherein the predetermined position is closer to the top surface than to the bottom surface of the paper carrying tray.

* * * * *